US011341296B2

(12) United States Patent
Voirin

(10) Patent No.: US 11,341,296 B2
(45) Date of Patent: May 24, 2022

(54) METHOD FOR COMPUTING AN UNFOLDED PART OF A MODELED BENDED PART OF A 3D OBJECT

(71) Applicant: Dassault Systemes, Velizy Villacoublay (FR)

(72) Inventor: Pierre Denis Voirin, Trets (FR)

(73) Assignee: DASSAULT SYSTEMES, Velizy Villacoublay (FR)

( * ) Notice: Subject to any disclaimer, the term of this patent is extended or adjusted under 35 U.S.C. 154(b) by 637 days.

(21) Appl. No.: 16/215,070

(22) Filed: Dec. 10, 2018

(65) Prior Publication Data

US 2019/0197202 A1 Jun. 27, 2019

(30) Foreign Application Priority Data

Dec. 22, 2017 (EP) .................................... 17306924

(51) Int. Cl.
*G06T 17/20* (2006.01)
*G06F 30/20* (2020.01)
(Continued)

(52) U.S. Cl.
CPC .............. *G06F 30/20* (2020.01); *G06F 30/17* (2020.01); *G06T 17/20* (2013.01); *G06T 19/20* (2013.01);
(Continued)

(58) Field of Classification Search
CPC ...... G06F 30/17; G06F 30/20; G06F 2113/24; G06T 17/20
See application file for complete search history.

(56) References Cited

U.S. PATENT DOCUMENTS 6,219,055 B1 * 4/2001 Bhargava ................ G06T 17/10
345/420
2010/0106463 A1 4/2010 Hindman et al.
(Continued)

OTHER PUBLICATIONS

European Search Report for European Application No. EP 17306924.6, titled: Method for Computing an Unfolded Part of a Modeled Bended Part of a 3D Object, Date of Completion of Search: Jun. 4, 2018.
(Continued)

*Primary Examiner* — Andrea C Leggett
(74) *Attorney, Agent, or Firm* — Hamilton, Brook, Smith & Reynolds, P.C.

(57) ABSTRACT

A computer-implemented method computes an unfolded part of a modeled bended 3D object in a 3D scene of a computer-aided design system. The method a) provides the 3D object; b) selects a fixed portion (FP) of the 3D object; c) selects a mobile portion (MP) of the 3D object; d) determines a 1D interface (INT) forming an intersection between the fixed portion (FP) and the mobile portion; e) computes a transformed portion resulting from a linear transformation of the mobile portion (MP) according to an drawing direction (DD); f) trims the transformed portion in the vicinity of the 1D interface (INT), thereby forming a trimmed transformed portion (TTP); g) creates a fillet (FI) between the 1D interface (INT) and the trimmed transformed portion (TTP); and h) defines the unfolded part as an union of the fixed portion (FP), the trimmed transformed portion (TTP) and the created fillet (FI).

11 Claims, 8 Drawing Sheets

(51) Int. Cl.
*G06F 30/17* (2020.01)
*G06T 19/20* (2011.01)
*G06F 113/24* (2020.01)
*G06F 119/18* (2020.01)

(52) U.S. Cl.
CPC ...... *G06F 2113/24* (2020.01); *G06F 2119/18* (2020.01)

(56) References Cited

U.S. PATENT DOCUMENTS

| | | | |
|---|---|---|---|
| 2013/0297263 A1 | 11/2013 | Chen et al. | |
| 2013/0332118 A1* | 12/2013 | Santiquet | G06T 19/20 703/1 |
| 2014/0354636 A1* | 12/2014 | Rorato | G06T 9/00 345/420 |
| 2015/0026645 A1* | 1/2015 | Delfino | G06F 3/04842 715/838 |
| 2015/0161296 A1* | 6/2015 | Apanovitch | B21D 22/20 700/98 |
| 2015/0243075 A1* | 8/2015 | Hong | G06V 20/647 345/420 |
| 2016/0048293 A1* | 2/2016 | Chen | G06F 3/04842 715/851 |
| 2016/0063174 A1* | 3/2016 | Rameau | G06T 17/10 703/1 |
| 2016/0162603 A1* | 6/2016 | Schriesheim | G06F 30/00 703/1 |
| 2016/0187866 A1* | 6/2016 | Noda | G05B 19/4093 700/187 |
| 2016/0350335 A1* | 12/2016 | Rorato | G06F 16/532 |

OTHER PUBLICATIONS

Lang, Zhikui et al., "Geometry Unfolding Algorithm Based on Finite Element Mesh Surface with Mixed Elements," International Journal for Computational Methods in Engineering Science and Mechanics, 8(4): 189-193 (May 30, 2007).

Prasad, K.S.R.K. et al., "On the considerations for the design of an automated aircraft sheet metal component production loft generation system" International Journal of Production Research, 43(14): 3045-3067 (Jul. 2005).

* cited by examiner

METHOD FOR COMPUTING AN UNFOLDED PART OF A MODELED BENDED PART OF A 3D OBJECT

RELATED APPLICATION

This application claims priority under 35 U.S.C. § 119 or 365 to European Application No. 17306924.6, filed Dec. 22, 2017. The entire teachings of the above application(s) are incorporated herein by reference.

FIELD OF INVENTION

The invention relates to a method for computing an unfolded part of a modeled bended part of a 3D object. It pertains to the field of wire frame and surface design by using a CAD (Computer Aided Design), a CAM (Computer Aided Manufacturing), or a CAE (Computer Aided Engineering) system. It is applied more precisely to the sheet-metal forming processes.

BACKGROUND

Die manufacturing is a manufacturing process which is widely used in the industry, and more particularly in the automotive industry. FIG. 1 illustrates an example of different steps (OP0-OP5) of die manufacturing of a metal work piece, from the raw sheet metal part (OP0) to the final part (result of OP5). Die manufacturing can include, for example, a die-stamping step (result of OP1), a die-cutting step (result of OP2 to OP4), and a wiping die-bending step (result of OP5). Die-stamping step and wiping die-bending are considered as plastic deformation processes. The result of a wiping die-bending is developable, whereas the result of a die-stamping may not be developable. FIG. 2 illustrates a detailed view of the wiping die-bending step. The wiping die-bending process, hereafter referred as die-bending, consists in maintaining a sheet metal part of an object between an upper pressure pad and a lower post. The upper pressure pad applies a pressure to hold a fixed portion of the sheet metal part firmly against the lower post. A cantilever part of the sheet metal part, hereafter the mobile portion, lies under the pressure of an upper punch. The upper punch travels down with an upper press ram, according to a drawing direction. The wiping die bending process yields an elongation or a local shrinkage of the metal sheet. These mechanical deformations have to be taken into account during the development of the flat pattern of an object.

To define a die manufacturing process in a CAD system, the user of the CAD system generally starts from the final part (result of OP5 in FIGS. 1 and 2) and go backward in the process to generate the different geometries resulting from each step. Thus, when defining a die-bending step, the user needs to unfold a die-bended surface of a 3D object in the CAD system, while considering the mechanical deformations which would occur during the die-bending step of the corresponding physical object. Besides, as illustrated in the example shown by FIG. 2, the user may want to unfold only a part of a mobile portion, in order to keep as unchanged some geometries of the folded/unfolded surface.

SUMMARY

There are currently three ways of computing the partial unfold/fold of a surface.

The first one can be made through simulation. The user computes a partial unfolded surface, by using a simulation software which is specialized in unfolding/folding surfaces. A model of the real folding/unfolding process is calculated in the simulation software by using the finite element method. A meshing of the entire folded surface is performed, thus the computation is highly time consuming.

The computing of the partial unfold/fold of a surface can also be performed through using manual geometry measurements in a CAD system. The user computes an estimation of the unfolded surface by computing a specific rotation of the surface to unfold in order to simulate the unfolding/folding, and then designs manually the folding area using the available surface design tools of the CAD system. This solution is tedious, since it requires a lot of computations and interactions from the user.

According to a third way, the user of a CAD system integrates unfolding information to each surface to unfold. The partial unfolded/folded surface is be computed automatically by the CAD system, based on the integrated unfolding information. This solution does not apply on surfaces where no unfold information has been stored during the design.

A goal of the invention is then to provide a method for computing quickly a partial unfold of a modeled bended 3D object, which does not require tedious interactions with the user, and which does not require integrated unfolding information.

It is proposed, according to one aspect of the invention, a computer-implemented method for computing an unfolded part of a modeled bended 3D object in a 3D scene of a computer-aided design system, the method comprising the steps of:

a) providing the 3D object;
   b) selecting a fixed portion of the 3D object;
   c) selecting a mobile portion (MP) of the 3D object;
   d) determining a 1D interface forming an intersection between the fixed portion and the mobile portion;
   e) computing a transformed portion resulting from a linear transformation of the mobile portion;
   f) trimming the transformed portion in the vicinity of the 1D interface, thereby forming a trimmed transformed portion;
   g) creating a fillet between the 1D interface and the trimmed transformed portion;
   h) defining the unfolded part as an union of the fixed portion, the trimmed transformed portion and the created fillet.

According to particular embodiments of the invention:

The step e) of computing a transformed portion may comprise the sub-steps of:

e1) meshing the 1D interface into a set of 3D points;
   e2) at each 3D point, creating a normal to the 1D interface and a plane, called an arc plane, said arc plane being defined by said normal and by an orientation vector;
   e3) computing, at each 3D point, a circular arc in the arc plane, whose central angle depends on a drawing direction of the modeled bended 3D object;
   e4) computing the mean value of the lengths of all the circular arcs;
   e5) storing, as a principal circular arc, the circular arc whose length is closest to the mean length of all the circular arcs;
   e6) determining an initial axis system positioned on the intersection curve between the arc plane of the principal circular arc and the mobile portion, at a length depending on the bend allowance of the principal circular arc;

e7) determining a target axis system, whose origin is the end point of the principal circular arc;

e8) defining the linear transformation as the transformation of the initial axis system into the target axis system.

The orientation vector may be the normal to the 1D interface in the plane which is tangent to the 3D point.

Alternatively, the orientation vector may be the normal, at the 3D point, to a segment binding two extremity 3D points of the set of 3D points.

Alternatively, the orientation vector may be computed based on the drawing direction.

The step f) of trimming the transformed portion may comprise the sub-steps of:

f1) for each circular arc, determining a circular arc end point, which is the extremity of the circular arc opposite to the 3D point;

f2) computing an end curve binding all the circular arc end points;

f3) computing a projected curve, which is the projection of the end curve on the transformed portion, said projected curve splitting the transformed portion into two transformed portion components;

f4) trimming, along the projected curve, the transformed portion component which is closest to the 1D interface (INT).

The step g) of creating a fillet may comprise the adaptation of the circular arcs to the boundaries of the trimmed transformed portion.

Another object of the invention is a method of manufacturing an object through wiping die bending based on a computer modeled 3D object, the method comprising at least a folding step, said method also comprising the steps of:

Computing the unfolding of a folded part of said 3D object through the predefined method;

Determining a modification of the dimensions of the 3D object due to the unfolding of the folded part;

Physically manufacturing said object based on the computer modeled 3D object, considering the modification of the dimensions of the 3D object due to the unfolding of the folded part.

Another object of the invention is a computer program product, stored on a non-transitory computer-readable data-storage medium, comprising computer-executable instructions to cause a computer system to carry out the predefined method.

Another object of the invention is a non-transitory computer-readable data-storage medium containing computer-executable instructions to cause a computer system to carry out the predefined method.

Another object of the invention is a computer system comprising a processor coupled to a memory and a graphical user interface, the memory storing computer-executable instructions to cause the computer system to carry out the predefined method.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

The invention will be better understood with the help of some embodiments described by way of non-limiting examples and illustrated by the accompanying drawings wherein.

DETAILED DESCRIPTION

A description of example embodiments follows.

Figure 1:
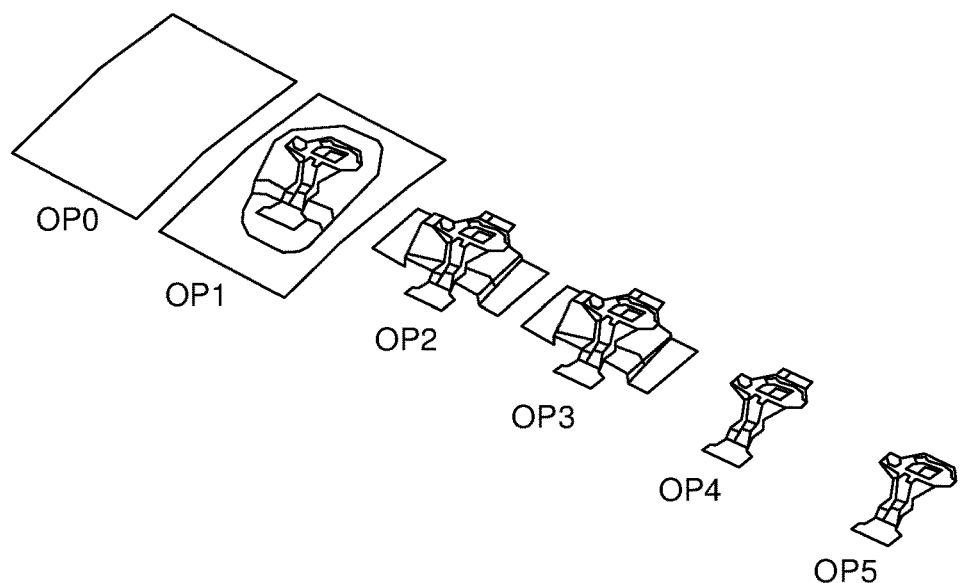
FIG. 1 illustrates different steps of a die manufacturing process on a 3D object.
Figure 2:
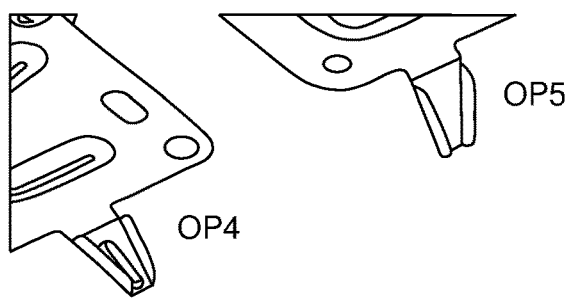
FIG. 2 illustrates a step of wiping die-bending on a 3D object.
Figure 3:
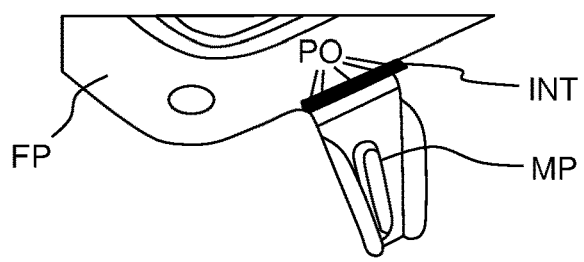
FIG. 3 illustrates the mobile portion of a modeled bended 3D object.

FIG. 3 illustrates a perspective view of a 3D object. The 3D object comprises a fixed portion FP, and a mobile portion MP. In a physical die-manufacturing process, the mobile portion MP would have lied under the pressure of an upper punch. In a first step of the method, the user drags the pointing element so as to define the 1D interface between the fixed portion FP and the mobile portion MP. The dragging of the pointing element can be realized with a mouse press, while drawing a straight line. Then system then meshes the 1D interface INT into a set of 3D points PO. A 3D point PO is created for each intersection of the 1D interface INT with the mobile portion MP. Thus, a discretization of the 1D interface INT is made.

Figure 4:
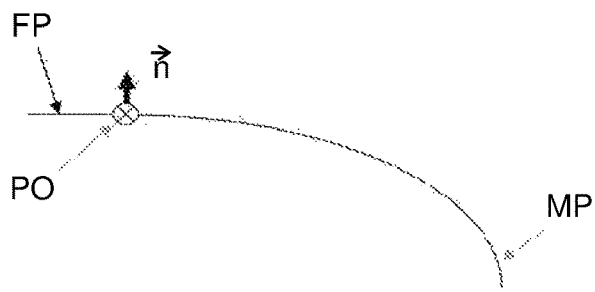
FIGS. 4 to 16 illustrate schematically different steps of the computing of an unfolded part of a modeled bended 3D object.

The invention comprises a step of computing a circular arc CA for each 3D point PO. FIGS. 4 to 6 illustrate such a step. FIG. 4 illustrates a side view of the fixed portion FP and the mobile portion MP. The 1D interface INT is the normal to the view. At each 3D point PO, a normal $\vec{n}$ to the surface of the mobile portion MP is computed. Then, an arc plane AP is computed for each 3D point PO. The origin of the arc plane AP is the 3D point PO. The normal $\vec{n}$ to the surface of the mobile portion MP is a first vector of the arc plane AP. An orientation vector $\vec{v}$ defines the second vector which defines the arc plane AP.

Figure 5A:
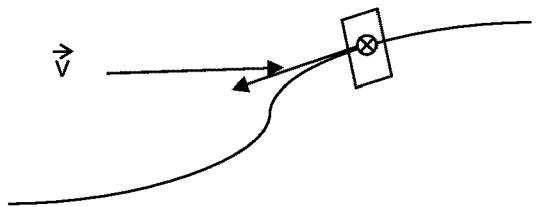
Figure 6:
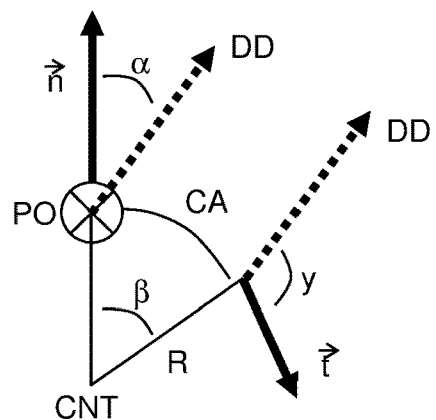

FIG. 5A illustrates a first embodiment of the determination of the orientation vector $\vec{v}$. According to this first embodiment, the tangent plane to the 3D point PO is computed. By construction, the 1D interface belongs to the tangent plane. The orientation vector $\vec{v}$ is orthogonal to the 1D interface at the 3D point PO, in the tangent plane.

Figure 5B:
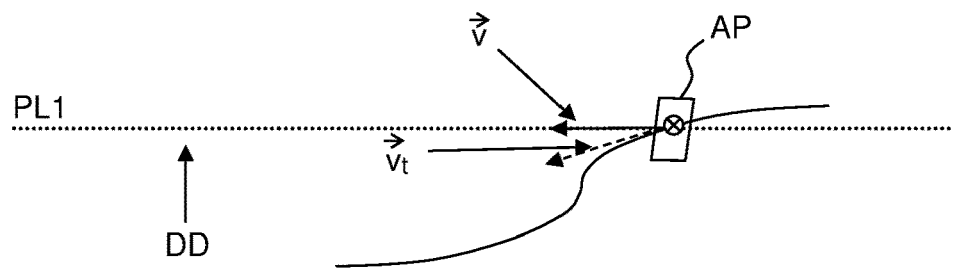

FIG. 5B illustrates a second embodiment of the determination of the orientation vector $\vec{v}$. According to this second embodiment, the tangent plane to the 3D point PO is computed. By construction, the 1D interface belongs to the tangent plane. The vector $\vec{v}_t$ is orthogonal to the 1D interface at the 3D point PO, in the tangent plane. Then, the vector $\vec{v}_t$ is projected on a plane PL1 which is normal to a predefined drawing direction DD and which passes through the 3D point PO, resulting in the orientation vector $\vec{v}$. The drawing direction DD is the direction of the die bending punch in the die-bending process; the drawing direction DD is a parameter which can be defined by the user.

Figure 5C:
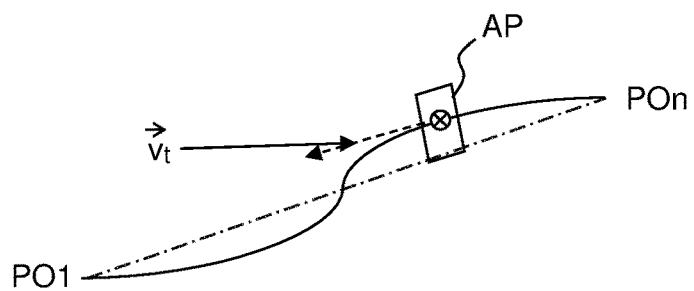

FIG. 5C illustrates a third embodiment of the determination of the orientation vector $\vec{v}$. The line made by the first 3D point PO1 and the last 3D point POn of the 1D interface is computed. The "first" and "last" 3D points indifferently refer to the extremity 3D points of the 1D interface. Then, the projection of the 3D point PO on the line is computed. The orientation vector $\vec{v}$ is defined by the projection of the 3D point PO and by the 3D point PO.

Figure 5D:
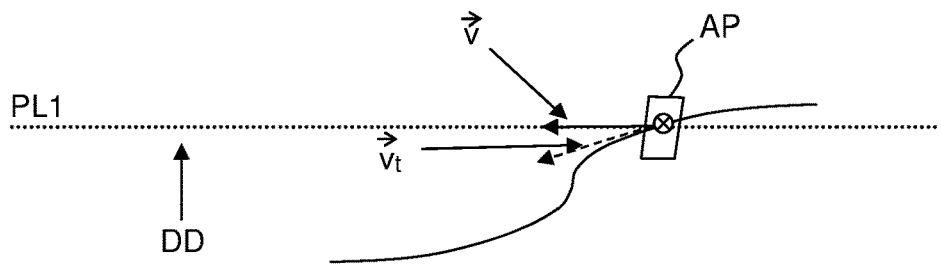

FIG. 5D illustrates a fourth embodiment of the determination of the orientation vector $\vec{v}$. The projection of the 3D point PO on the line defined by both extremity 3D points is computed, like in the third embodiment. The vector which is defined by the projection of the 3D point and by the 3D point is projected on the plane which is normal to the drawing direction DD resulting in an orientation vector $\vec{v}$. The predefined drawing direction has been previously defined for the second embodiment.

For each 3D point PO, an orientation vector $\vec{v}$ is computed, according to one of the embodiment which is selected by the user. The orientation vector $\vec{v}$ and the normal $\vec{n}$ define an arc plane AP for each 3D point PO. In each arc plane AP, a circular arc CA is computed. FIG. 6 is a normal view to the arc plane AP. First, the angle α between the normal $\vec{n}$ to the surface of the mobile portion MP and the predefined reference direction is computed. The unfold angle γ is provided by the user, or it can be automatically predefined. The tangent $\vec{t}$ to the circular arc CA is computed from a vector representing the drawing direction DD and the unfold angle γ. The central angle β of the circular arc CA is equal to the difference between the unfold angle γ and the angle α. The central angle β is computed for each 3D point PO.

According to a first embodiment, the arc radius R is computed by the system. For that, a minimum arc length ($LCA_{min}$) and a maximum arc length ($LCA_{max}$) are required. These values can be input by the user in an initial step. The minimum central angle β ($β_{min}$) and the maximum central angle β ($β_{max}$) are determined. For each 3D point PO, the arc radius R is then computed as follow, for each 3D point:

If $β=β_{max}, R=LCA_{max}/β$

If $β=β_{min}, R=LCA_{min}/β$

In other cases, $R=LCA_{max}-c*(LCA_{max}-LCA_{min})$,

With $c=(β-β_{min})/(β_{max}-β_{min})$

According to a second embodiment, the user can specify the arc radius R, for each 3D point PO.

For each 3D point PO, the system can store an automatically computed value of the arc radius R (i.e. according to the first embodiment), and a manually input value of the arc radius R (i.e. according to the second embodiment). The default value of the arc radius, without any input of the user, is the automatically computed value.

Therefore, for each 3D point PO, a central angle β and an arc radius R are computed, thereby defining a set of circular arc CA. The center CNT of each circular arc CA is positioned on the line defined by normal $\vec{n}$ which passes by the 3D point PO, at a distance R from the 3D point PO.

In a following step, the system computes a target axis system TAS, and an initial axis system IAS, in order to compute the linear transformation of the initial axis system IAS to the target axis system TAS.

Figure 7:
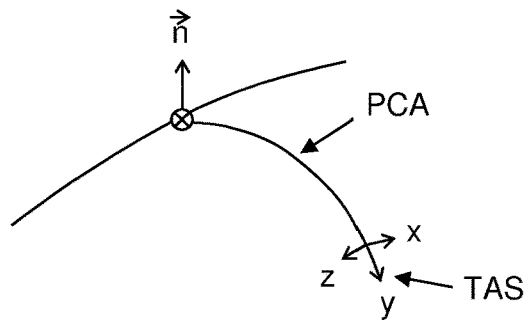

For that, the mean value of the lengths of all the circular arcs CA is computed. Then, the circular arc CA whose length is closest to the mean length of all the circular arcs is defined and stored as a principal circular arc PCA, as illustrated by FIG. 7. The end point of the principal circular arc PCA, which is opposed to the 3D point PO, is referred as the origin of a target axis system TAS. The Y axis is defined as the tangent direction to the principal circular arc PCA on its end point. The Z axis is defined as the normal direction to the principal circular arc PCA on its end point, in the arc plane AP of the principal circular arc PCA and oriented in the same direction as the normal $\vec{n}$ to the 3D point PO. The X axis is the cross product of Z axis with Y axis.

Figure 8:
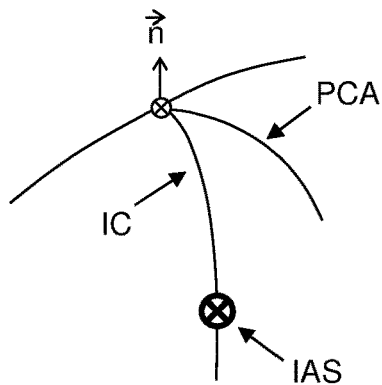
Figure 9:
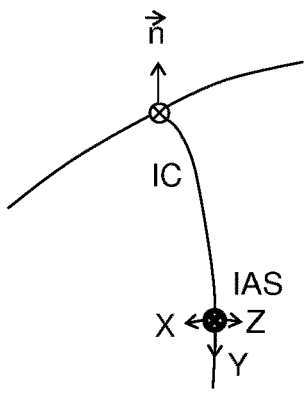
Figure 10:
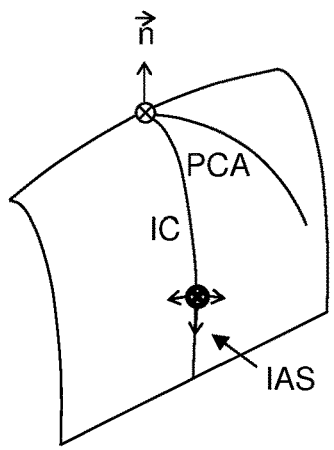

FIGS. 8 to 10 illustrate the computing of the initial axis system IAS. The length L1 of the principal circular arc PCA is computed. The equivalent unfolded length (i.e. length of the principal circular arc PCA when it is completely unfolded, as a line) is then computed, using the K-Factor and sheet metal thickness. The K-factor, which is known from the skilled person in metal working, is a ratio which can be easily retrieved for a given material. It is used to calculate flat patterns because it is directly related to how much material is stretched during the bending. The user specifies the sheet metal thickness. He can either specify a K-Factor value manually, or use an automatic mode, in which the system computes the best K-Factor when unfolding/folding the mobile portion MP. Then, the bend allowance of the principal circular arc PCA is computed. The bend allowance is defined as the material which has to be added to the length of the principal circular arc PCA in order to develop a flat pattern. The formula of the bend allowance is also known from the skilled person in metal working.

The intersection curve IC between the arc plane AP of the principal circular arc PCA and the mobile portion MP is computed. The length of the intersection curve IC is the above-mentioned equivalent unfolded length (L2). The latter is then transformed in an equivalent folded length on the intersection curve IC, by deducting the length of the principal circular arc PCA from the length of the intersection curve IC. The end of the intersection curve IC at the equivalent folded length is defined as the origin of the initial axis system IAS. The Y axis of the initial axis system IAS is the tangent to the intersection curve IC at the origin of said axis system. The Z axis is the normal of the mobile portion MP at the origin of the initial axis system IAS. The X axis is the cross product of Z axis with Y axis.

Figure 11:
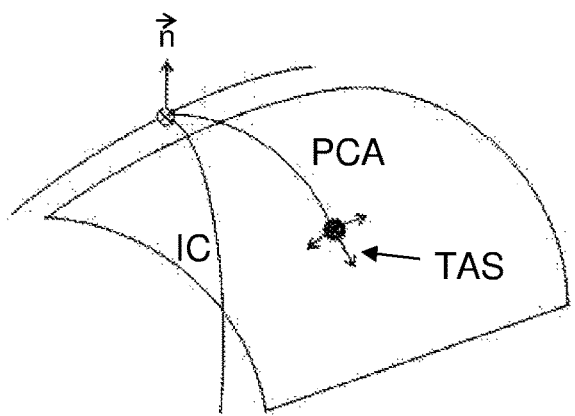

The linear transformation (rotation and translation) of the initial axis system IAS to the target axis system TAS is applied to the whole mobile portion MP. FIG. 10 illustrates the mobile portion MP before the linear transformation, and FIG. 11 illustrates the mobile portion MP after the linear transformation.

Figure 12:
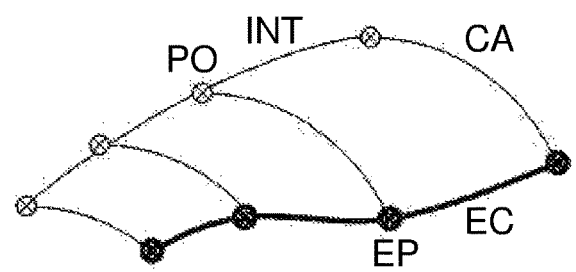

Each circular arc CA is delimited by a 3D point PO, and by an end point EP, as illustrated by FIG. 12. The end point EP is a point located on the circular arc CA, at a length L=β×R, β being the central angle and R being the arc radius. The end curve EC is a continuous polyline, which is composed of all the segments binding the end points EP one to each other. According to an embodiment, the polyline can be curve-fitted.

Figure 13:
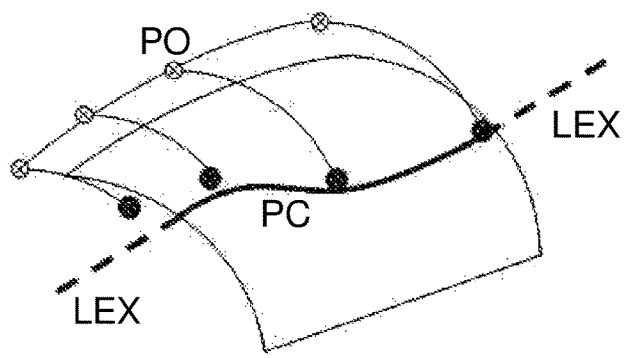

The system then performs a normal projection of the end curve EC on the mobile portion MP which has been transformed according to the linear transformation. The projected curve PC is extended at both extremities, by lines LEX which are tangent to the extremities of the projected end curve PC, as illustrated by FIG. 13.

Figure 14:
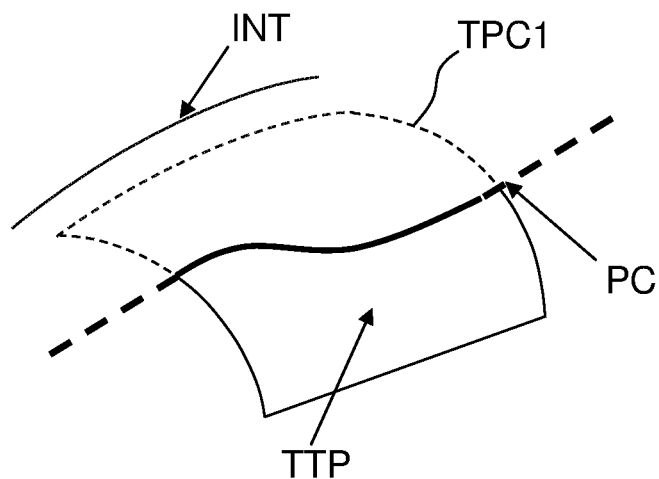

The mobile portion MP which has been transformed according to the linear transformation is then split up by the projected curve PC into two components (TPC1, TTP), as illustrated by FIG. 14. Among those two components (TPC1, TTP), the one which is in the vicinity of the 1D interface INT, i.e. which is closest to the 1D interface INT, is removed. The other component is stored; it is defined as the trimmed transformed portion TTP.

Figure 15:
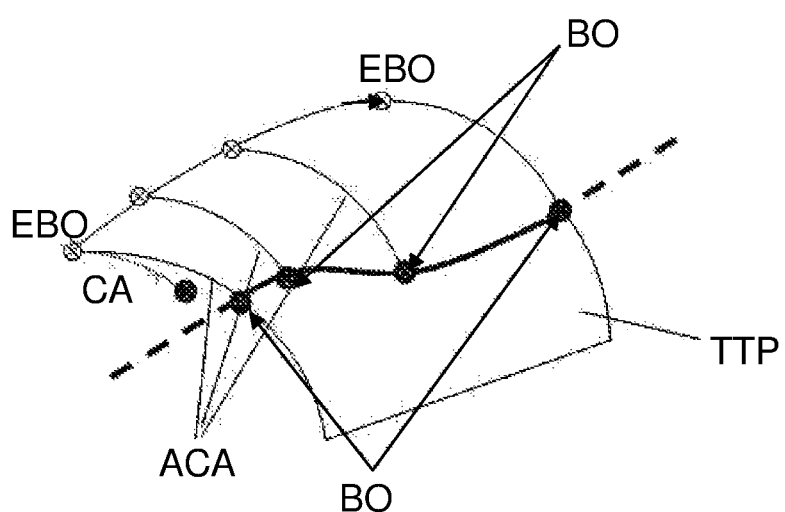

In FIG. 15, the circulars arcs CA are adapted to the extremity boundaries EBO of the fixed portion FP at the 1D interface, thereby forming a fillet FI. The adaptation is performed in order to ensure a maximum tangency between the circular arcs and the fixed portion FP at the 1D interface. The extremity boundaries EBO refer to the first and to the last 3D point PO of the 1D interface. The circulars arcs CA are also adapted to all the boundaries of the trimmed transformed portion TTP. The boundaries BO of the trimmed transformed portion TTP are the points of the projected curve PC in each arc plane AP. The adaptation of the circulars arcs CA is also performed so as to ensure a maximum tangency between the circular arcs and the trimmed transformed portion TTP at the boundaries BO. This step of adapting the circular arcs CA to ensure tangencies at the boundaries BO can be carried out by a constraint-solver. A constraint solver is a set of software algorithms that solve systems of non-linear algebraic equations. It is typically used in a CAD application to satisfy relationships (constraints) between geometries in different. The constraint solver inputs are defined as geometries (2D or 3D), geometrical constraints (kinematic joints or elementary constraints like tangency and coincidence), variables, and equations. Several types of solving can be performed. The results are generally given as a set of transformations (to apply to the geometries to solve the system) and values. The shape and size of the fillet FI can also be modified by the user, through the manual modification of the arc radius R of each of the 3D points PO.

Figure 16:
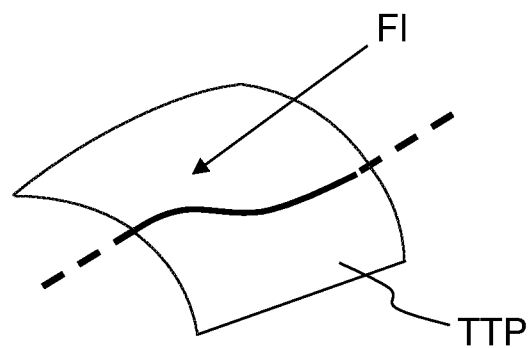

In a last step, illustrated by FIG. 16, the fixed portion FP (not represented), the fillet FI and the trimmed transformed portion TTP are assembled. The computed surface of this assembly is the unfolded part of the modeled bended 3D object.

Figure 17:
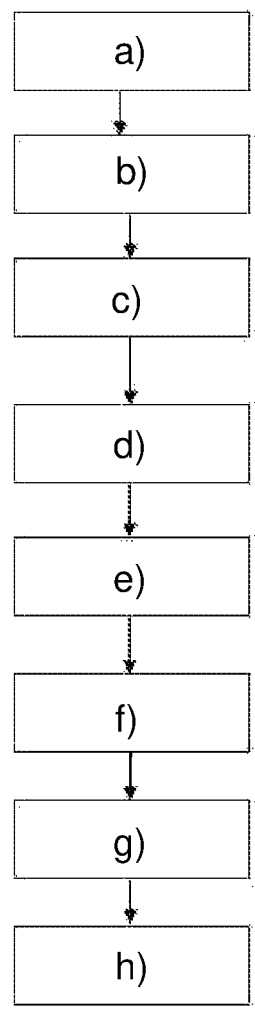
FIG. 17 illustrates the different steps of a method according to the invention.

FIG. 17 illustrates the main steps of the method.
a) providing the 3D object;
b) selecting a fixed portion (FP) of the 3D object;
c) selecting a mobile portion (MP) of the 3D object;
d) determining a 1D interface (INT) forming an intersection between the fixed portion (FP) and the mobile portion;
e) computing a transformed portion resulting from a linear transformation of the mobile portion (MP);
f) trimming the transformed portion in the vicinity of the 1D interface (INT);
g) creating a fillet (FI) between the 1D interface (INT) and the trimmed transformed portion (TTP);
h) defining the unfolded part as an union of the fixed portion (FP), the trimmed transformed portion (TTP) and the created fillet (FI).

The inventive method can be performed by a suitably-programmed general-purpose computer or computer system, possibly including a computer network, storing a suitable program in non-volatile form on a computer-readable medium such as a hard disk, a solid state disk or a CD-ROM and executing said program using its microprocessor(s) and memory.

Figure 18:
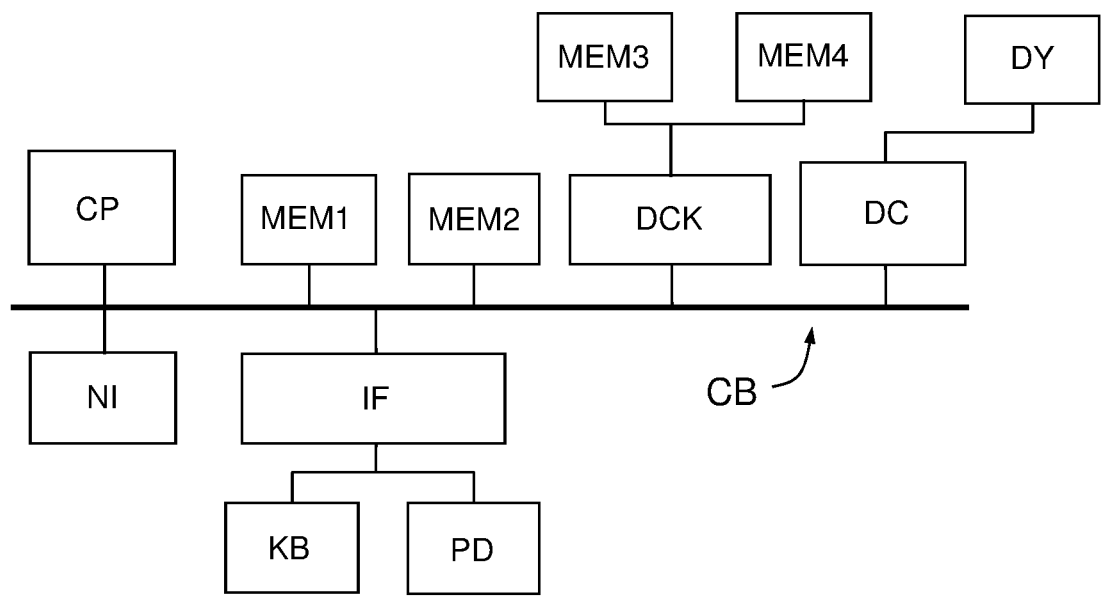
FIGS. 18 and 19 illustrate block diagrams of respective computer systems suitable for carrying out a method according to different embodiments of the invention.

A computer suitable for carrying out a method according to an exemplary embodiment of the present invention is described with reference to FIG. 18. In FIG. 18, the computer includes a Central Processing Unit (CP) which performs the method step described above while running an executable program, i.e. a set of computer-readable instructions, stored in a memory device such as RAM MEM1 or ROM MEM2 or hard disk drive (HDD) MEM3, DVD/CD drive MEM4, or stored remotely. Moreover, one or more computer files defining the bended 3D object may also be stored on one or more of memory devices MEM1 to MEM4, or remotely.

The claimed invention is not limited by the form of the computer-readable media on which the computer-readable instructions of the inventive process are stored. For example, the instructions and files can be stored on CDs, DVDs, in FLASH memory, RAM, ROM, PROM, EPROM, EEPROM, hard disk or any other information processing device with which the computer communicates, such as a server or computer. The program can be stored on a same memory device or on different memory devices.

Further, a computer program suitable for carrying out the inventive method can be provided as a utility application, background daemon, or component of an operating system, or combination thereof, executing in conjunction with CPU CP and an operating system such as Microsoft VISTA, Microsoft Windows 8, UNIX, Solaris, LINUX, Apple MAC-OS and other systems known to those skilled in the art.

Central Processing Unit CP can be a Xenon processor from Intel of America or an Opteron processor from AMD of America, or can be other processor types, such as a Freescale ColdFire, IMX, or ARM processor from Freescale Corporation of America. Alternatively, the CPU can be a processor such as a Core2 Duo from Intel Corporation of America, or can be implemented on an FPGA, ASIC, PLD or using discrete logic circuits, as one of ordinary skill in the art would recognize. Further, the CPU can be implemented as multiple processors cooperatively working to perform the computer-readable instructions of the inventive processes described above.

The computer in FIG. 18 also includes a network interface NI, such as an Intel Ethernet PRO network interface card from Intel Corporation of America, for interfacing with a network, such as a local area network (LAN), wide area network (WAN), the Internet and the like. The computer further includes a display controller DC, such as a NVIDIA GeForce GTX graphics adaptor from NVIDIA Corporation of America for interfacing with display DY, such as a Hewlett Packard HPL2445w LCD monitor. A general purpose I/O interface IF interfaces with a keyboard KB and pointing device PD, such as a roller ball, mouse, touchpad and the like. The display, the keyboard, the sensitive surface for the touch mode and the pointing device, together with the display controller and the I/O interfaces, form a graphical user interface, used by the user to provide input commands—e.g. to move the pointer—and by the computer for displaying the three-dimensional scene and the graphical tool.

Disk controller DKC connects HDD MEM3 and DVD/CD MEM4 with communication bus CBS, which can be an ISA, EISA, VESA, PCI, or similar, for interconnecting all of the components of the computer.

A description of the general features and functionality of the display, keyboard, pointing device, as well as the display controller, disk controller, network interface and I/O interface is omitted herein for brevity as these features are known.

Figure 19:
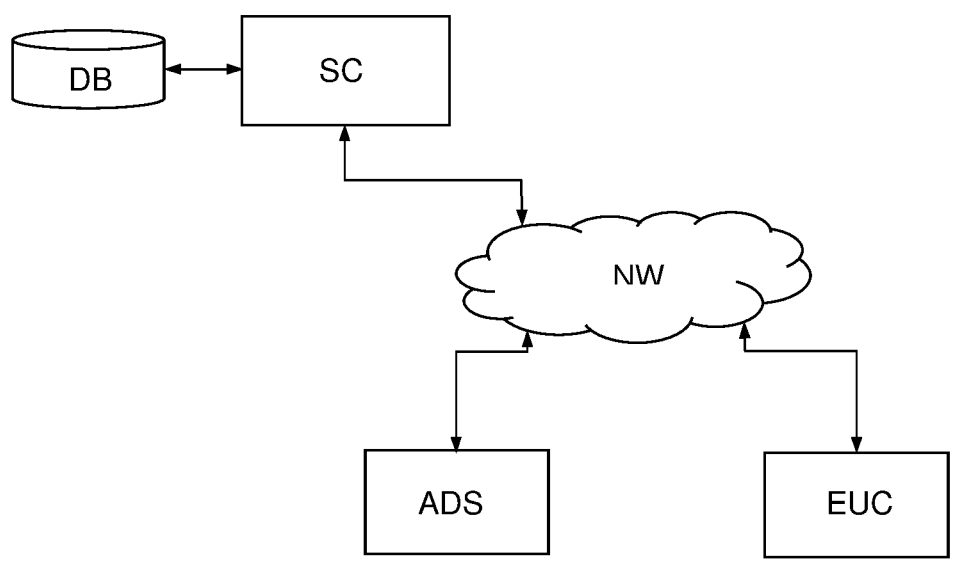

FIG. 19 is a block diagram of a computer system suitable for carrying out a method according to a different exemplary embodiment of the present invention.

In FIG. 19, the executable program and the computer files defining the bended 3D object are stored on memory devices connected to a server SC. The memory devices and the overall architecture of the server may be the same as discussed above with reference to FIG. 18, except that display controller, sensitive surface, display, keyboard and/or pointing device may be missing in the server.

The server SC is then connected to an administrator system ADS and end user computer EUC via a network NW.

The overall architectures of the administrator system and of the end user computer may be the same as discussed above with reference to FIG. 18, except that the memory devices of the administrator system and the end user computer do not store the executable program and/or the computer files defining the bended 3D object. However, the end user computer does store a client program designed for cooperating with the executable program of the server, as it will be discussed below.

As can be appreciated, the network NW can be a public network, such as the Internet, or a private network such as an LAN or WAN network, or any combination thereof and can also include PSTN or ISDN sub-networks. The network NW can also be wired, such as an Ethernet network, or can be wireless such as a cellular network including EDGE, 3G and 4G wireless cellular systems. The wireless network can also be Wi-Fi, Bluetooth, or any other wireless form of communication that is known. Thus, the network NW is merely exemplary and in no way limits the scope of the present advancements.

The client program stored in a memory device of the end user computer and executed by a CPU of the latter accesses, via the network NW, a database DB stored by the server SC and containing files defining the modeled bended 3D object. The server performs the processing as described above, and transmits to the end user computer a file corresponding to the desired representation of the scene including the unfolded part, again using the network NW.

Although only one administrator system ADS and one end user system EUC are shown, the system can support any number of administrator systems and/or end user systems without limitation. Similarly, multiple servers can also be implemented in the system without departing from the scope of the present invention.

Any method steps described herein should be understood as representing modules, segments, or portions of code which include one or more executable instructions for implementing specific logical functions or steps in the process, and alternate implementations are included within the scope of the exemplary embodiment of the present invention.

The teachings of all patents, published applications and references cited herein are incorporated by reference in their entirety.

While example embodiments have been particularly shown and described, it will be understood by those skilled in the art that various changes in form and details may be made therein without departing from the scope of the embodiments encompassed by the appended claims.

What is claimed is:

1. A computer-implemented method for computing an unfolded part of a modeled bended 3D object in a 3D scene of a computer-aided design system, the method comprising the steps of:
   a) providing the 3D object;
   b) selecting a fixed portion (FP) of the 3D object;
   c) selecting a mobile portion (MP) of the 3D object;
   d) receiving a user input which defines a 1D interface (INT) forming an intersection between the fixed portion (FP) and the mobile portion, said user input comprising dragging a pointing element between the fixed portion (FP) and the mobile portion (MP);
   e) computing a transformed portion resulting from a linear transformation of the mobile portion (MP);
   f) trimming the transformed portion in the vicinity of the 1D interface (INT), thereby forming a trimmed transformed portion (TTP);
   g) creating a fillet (FI) between the 1D interface (INT) and the trimmed transformed portion (TTP); and
   h) defining the unfolded part as a union of the fixed portion (FP), the trimmed transformed portion (TTP) and the created fillet (FI).

2. The method according to claim 1, wherein the step e) of computing a transformed portion comprises the sub-steps of:
   e1) meshing the 1D interface (INT) into a set of 3D points (PO);
   e2) at each 3D point (PO), creating a normal ($\vec{n}$) to the 1D interface (INT) and a plane, called an arc plane (AP), said arc plane (AP) being defined by said normal ($\vec{n}$) and by an orientation vector ($\vec{v}$);
   e3) computing, at each 3D point (PO), a circular arc (CA) in the arc plane (AP), whose central angle ($\beta$) depends on a drawing direction (DD) of the modeled bended 3D object;
   e4) computing the mean value of the lengths of all the circular arcs (CA);
   e5) storing, as a principal circular arc (PCA), the circular arc (CA) whose length is closest to the mean length of all the circular arcs;
   e6) determining an initial axis system (IAS) positioned on the intersection curve (IC) between the arc plane (AP) of the principal circular arc (PCA) and the mobile portion (MP), at a length depending on the bend allowance of the principal circular arc (PCA);
   e7) determining a target axis system (TAS), whose origin is the end point of the principal circular arc (PCA);
   e8) defining the linear transformation as the transformation of the initial axis system (IAS) into the target axis system (TAS).

3. The method according to claim 2, wherein the orientation vector ($\vec{v}$) is the normal to the 1D interface (INT) in the plane which is tangent to the 3D point (PO).

4. The method according to claim 2, wherein the orientation vector ($\vec{v}$) is the normal, at the 3D point (PO), to a segment binding two extremity 3D points (PO1, POn) of the set of 3D points (PO).

5. The method according to claim 3, wherein the orientation vector ($\vec{v}$) is computed based on the drawing direction (DD).

6. The method according to claim 2, wherein step f) of trimming the transformed portion comprises the sub-steps of:
   f1) for each circular arc (CA), determining a circular arc end point (EP), which is the extremity of the circular arc (CA) opposite to the 3D point (PO);
   f2) computing an end curve (EC) binding all the circular arc end points (EP);

f3) computing a projected curve (PC), which is the projection of the end curve (EC) on the transformed portion, said projected curve (PC) splitting the transformed portion into two transformed portion components (TPC1, TTP);

f4) trimming, along the projected curve (PC), the transformed portion component (TPC1) which is closest to the 1D interface (INT).

7. The method according to claim 2, wherein step g) of creating a fillet comprises the adaptation of the circular arcs (CA) to the boundaries (BO) of the trimmed transformed portion (TTP).

8. A method of manufacturing comprising:
planning manufacturing of an object through wiping die bending based on a computer modeled 3D object, and including in the manufacturing at least a folding step;
computing an unfolding of a folded part of said 3D object;
determining a modification of the dimensions of the 3D object due to the unfolding of the folded part; and
physically manufacturing said object based on the computer modeled 3D object, considering the modification of the dimensions of the 3D object due to the unfolding of the folded part, wherein the computing the unfolding being performed by:
a) providing the 3D object;
b) selecting a fixed portion (FP) of the 3D object;
c) selecting a mobile portion (MP) of the 3D object;
d) receiving a user input which defines a 1D interface (INT) forming an intersection between the fixed portion (FP) and the mobile portion, said user input comprising dragging a pointing element between the fixed portion (FP) and the mobile portion (MP);
e) computing a transformed portion resulting from a linear transformation of the mobile portion (MP);
f) trimming the transformed portion in the vicinity of the 1D interface (INT), thereby forming a trimmed transformed portion (TTP);
g) creating a fillet (FI) between the 1D interface (INT) and the trimmed transformed portion (TTP); and
h) defining the unfolded part as a union of the fixed portion (FP), the trimmed transformed portion (TTP) and the created fillet (FI).

9. A computer program product, comprising:
a non-transitory computer-readable data-storage medium (MEM1-MEM4), storing computer-executable instructions that cause a computer system to compute an unfolded part of a modeled bended 3D object in a 3D scene of a computer-aided design system;
the computer executable instructions including instructions that cause the computer system to:
a) provide the 3D object;
b) select fixed portion (FP) of the 3D object;
c) select a mobile portion (MP) of the 3D object;
d) receive a user input which defines a 1D interface (INT) forming an intersection between the fixed portion (FP) and the mobile portion, said user input comprising dragging a pointing element between the fixed portion (FP) and the mobile portion (MP);
e) compute a transformed portion resulting from a linear transformation of the mobile portion (MP);
f) trim the transformed portion in the vicinity of the 1D interface (INT), thereby forming a trimmed transformed portion (TTP);
g) create a fillet (FI) between the 1D interface (INT) and the trimmed transformed portion (TTP); and
h) define the unfolded part as a union of the fixed portion (FP), the trimmed transformed portion (TTP) and the created fillet (FI).

10. A non-transitory computer-readable data-storage medium (MEM1-MEM4) comprising:
a memory area containing computer-executable instructions (EXP) to cause a computer system to compute an unfolded part of a modeled bended 3D object in a 3D scene of a computer-aided design system by:
a) providing the 3D object;
b) selecting a fixed portion (FP) of the 3D object;
c) selecting a mobile portion (MP) of the 3D object;
d) receiving a user input which defines a 1D interface (INT) forming an intersection between the fixed portion (FP) and the mobile portion, said user input comprising dragging a pointing element between the fixed portion (FP) and the mobile portion (MP);
e) computing a transformed portion resulting from a linear transformation of the mobile portion (MP);
f) trimming the transformed portion in the vicinity of the 1D interface (INT), thereby forming a trimmed transformed portion (TTP);
g) creating a fillet (FI) between the 1D interface (INT) and the trimmed transformed portion (TTP); and
h) defining the unfolded part as a union of the fixed portion (FP), the trimmed transformed portion (TTP) and the created fillet (FI).

11. A computer system comprising:
a processor (CP) coupled to a memory (MEM1-MEM4) and a graphical user interface (KB, PD, DC, DY),
the memory storing computer-executable instructions (EXP) that cause the computer system to compute an unfolded part of a modeled bended 3D object in a 3D scene of a computer-aided design system by:
a) providing the 3D object;
b) selecting a fixed portion (FP) of the 3D object;
c) selecting a mobile portion (MP) of the 3D object;
d) receiving a user input which defines a 1D interface (INT) forming an intersection between the fixed portion (FP) and the mobile portion, said user input comprising dragging a pointing element between the fixed portion (FP) and the mobile portion (MP);
e) computing a transformed portion resulting from a linear transformation of the mobile portion (MP);
f) trimming the transformed portion in the vicinity of the 1D interface (INT), thereby forming a trimmed transformed portion (TTP);
g) creating a fillet (FI) between the 1D interface (INT) and the trimmed transformed portion (TTP); and
h) defining the unfolded part as a union of the fixed portion (FP), the trimmed transformed portion (TTP) and the created fillet (FI).

\* \* \* \* \*